United States Patent

Semin

[15] 3,636,296
[45] Jan. 18, 1972

[54] ARRANGEMENT FOR STOPPING AUTOMATICALLY AN ELECTRIC SPARK ERODING MACHINE HAVING ITS WORK-PERFORMING ELECTRODE TOOL IN THE SHAPE OF A WIRE OR BAND

[72] Inventor: Gennady Gavrilovich Semin, ulitsa Tsentralnaya, 15, kv. 31, Fryazino Moskovskoi Oblasti, U.S.S.R.

[22] Filed: Dec. 15, 1970
[21] Appl. No.: 98,274

[52] U.S. Cl. ..........................................219/69 S, 219/69 V
[51] Int. Cl. ............................................................B23p 1/08
[58] Field of Search ...............188/82.84; 192/45; 219/69 C, 219/69 E, 69 S, 69 V

[56] References Cited

UNITED STATES PATENTS 976,735  11/1910  Hardman .....................188/82.84 UX
2,974,212  3/1961  Inoue ..................................219/69 V Primary Examiner—R. F. Staubly
Attorney—Holman & Stern

[57] ABSTRACT

An arrangement for stopping an automatically the operation of an electric spark-eroding machine having a work-performing electrode tool thereof in the shape of a wire or band, wherein deenergization of the electric drives of the machine is effected by means of a mechanism including an overrunning clutch. The driving member of this overrunning clutch is the driving shaft of an electric motor, while the driven member of the clutch is a sleeve mounted eccentrically with respect to this driving shaft and rotatable relative thereto. The sleeve is provided with a projection adapted to engage a stationary abutment which is thus adapted to check the rotation of the sleeve and cause interruption of a source of electric power supplying an electrode which is in the shape of a wire or band to stop the machine in the event of an accidental wire or band breakage.

4 Claims, 3 Drawing Figures

ARRANGEMENT FOR STOPPING AUTOMATICALLY AN ELECTRIC SPARK ERODING MACHINE HAVING ITS WORK-PERFORMING ELECTRODE TOOL IN THE SHAPE OF A WIRE OR BAND

The present invention relates to electric spark-eroding machines, and, more particularly, it relates to arrangements for stopping automatically electric spark-eroding machines having their work-performing electrode tools in the shape of a wire or band, in cases of accidental breakage of this wire or band.

The present invention can be most successfully employed in spark eroding machines in which the work-performing electrode tool is a relatively thin (0.03 mm. to 0.3 mm. in diameter) wire fed through the working zone at a relatively low speed.

At present, there are widely known arrangements for stopping automatically electric spark-eroding machines, comprising a reel with an electrode wire or band thereon, from which this wire or band is unwound in operation, this reel being mounted on the driving shaft of a motor, and a ratchet wheel mounted on this driving shaft and operatively associated with a pawl having a longitudinal slot therein; this pawl, at moments when the ratchet wheel starts rotating in a reversed direction, operating a pair of electric contacts mounted adjacent thereto, whereby the electric drives of the machine become deenergized in cases of accidental breakage of the electrode tool.

However, in these known arrangements, at successive instances when the pawl slides off the successive apices of the teeth of the ratchet wheel, the electrode, the electrode wire is oscillated, which adversely affects the precision of the spark-eroding operation. This becomes particularly noticeable when the electrode wire is as thin as 0.03 mm. to 0.1 mm. Moreover, the inertial character of the operation of the ratchet wheel is responsible for the slackness appearing in the electrode wire as a result of spark discharges, not being always corrected in due time. Furthermore, the ratchet-and-pawl mechanisms of the known arrangements usually do not provide sufficiently long service life and adequately reliable performance.

It is an object of the present invention to provide an arrangement for stopping automatically the operation of an electric spark-eroding machine, which should minimize the amplitude of the oscillations of the work-performing electrode tool, which should demonstrate minimal inertia in its operation and which should be both reliable and durable.

This object is accomplished in an arrangement for stopping automatically an electric spark-eroding machine having the work-performing electrode tool thereof in the shape of a wire or band, which comprises a reel mounted on the driving shaft of a motor, said reel supporting thereon a supply of said electrode wire or band which is adapted to be unwound therefrom in operation of said machine, and a mechanism operatively associated with a switching arrangement electrically connected to deenergize the drive of said machine in cases of accidental breakage of said electrode wire or band, in which arrangement, in accordance with the present invention, said last-mentioned mechanism includes an overrunning clutch having a driving member including said driving shaft of said motor and a driven member including a sleeve mounted eccentrically with respect to said shaft, said sleeve being rotatable relative to said shaft, there being ball means mounted intermediate of said sleeve and said driving shaft and adapted to establish driving connection between said shaft and said sleeve, said sleeve having a projection on the external surface thereof, adapted to engage, in cases of accidental breakage of said wire or band, a stationary abutment, thus being able to check the rotation of said sleeve and to arrest said driving shaft of said motor. With the arrangement constructed in the aforesaid way, the amplitude of the oscillations of the work-performing electrode tool is minimized, the inertia of the arrangement is reduced, and the reliability and durability thereof are stepped up.

It is expedient for said projection of said sleeve to carry thereon an electric contact adapted to engage said stationary abutment in case of breakage of said electrode wire or band, said abutment acting as the other electric contact, whereby engagement of said contacts can be used to effect deenergization of the driving means of said machine and disconnection of the voltage supply to the spark generation zone of said machine.

The present invention can be better understood from the following detailed description of an embodiment thereof, with reference being had to the accompanying set of drawings, wherein.

Figure 1:
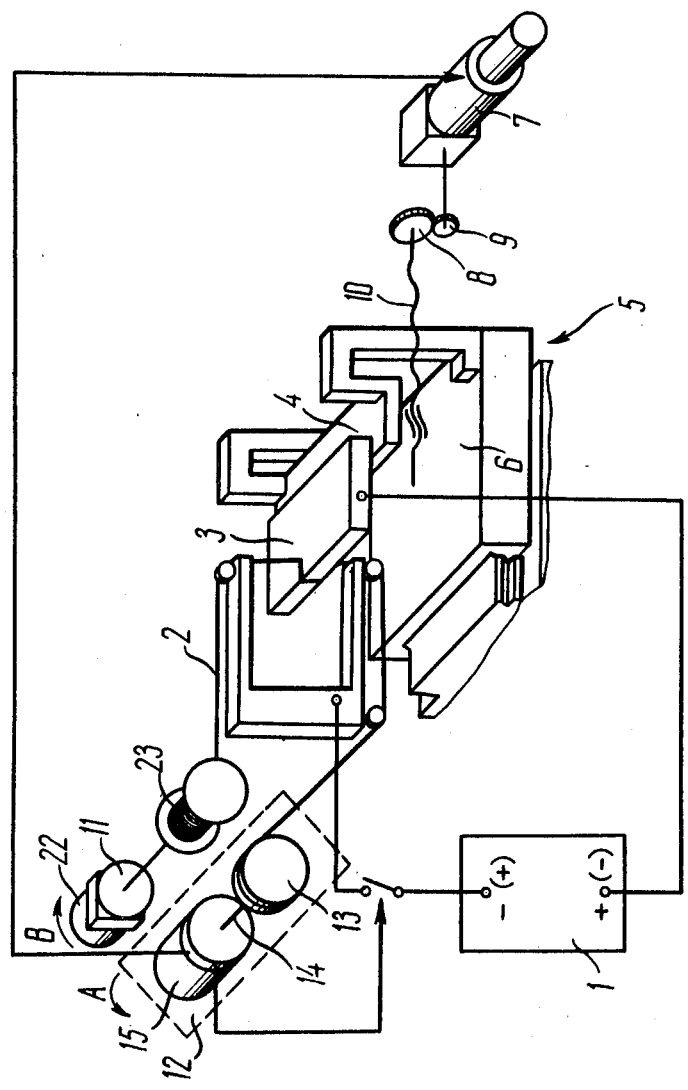
FIG. 1 shows schematically a part of the principal diagram of a spark-eroding machine incorporating an arrangement embodying the present invention.

Referring now in particular to the appended drawings, an electric spark-eroding machine, embodying the invention, includes a power supply source 1 (FIG. 1) providing electric power for creating electric spark discharges between the work-performing electrode tool in the shape of a wire 2 and a workpiece 3 mounted in a bracket 4. The bracket 4 is carried by a coordinate work table 5 of which the transversely movable support plate 6 is positionable by means of an electric motor 7 through a couple of meshing gears 8 and 9 and a microscrew 10.

The herein disclosed machine also incorporates a wire winding mechanism 11 and a device 12 for stopping the machine automatically in case of accidental breakage of the electrode wire 2.

Figure 2:
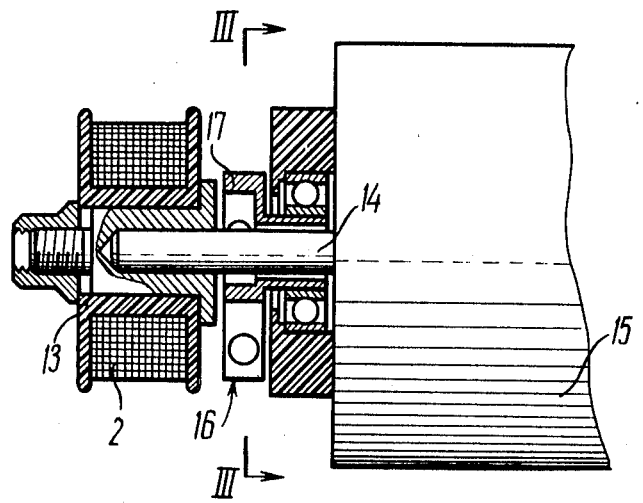
FIG. 2 is a longitudinal part sectional side view of an arrangement embodying the invention.
Figure 3:
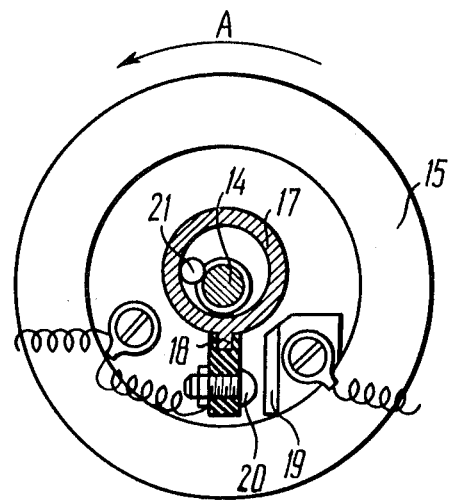
FIG. 3 is a cross-sectional view along line III—III of FIG. 2.

The device 12, in accordance with the present invention, comprises a reel 13 (FIG. 2) having a supply of the electrode wire 2 wound thereon, the reel 13 being mounted on the shaft 14 of an electric motor 15, and a mechanism operatingly associated with a switch controlling energization of the electric drive of the machine. The last-mentioned mechanism includes an overrunning clutch 16 of which the driving member is the shaft 14 of the electric motor 15, and of which the driven member is a sleeve 17 (FIG. 3). The sleeve 17 is mounted eccentrically about the shaft 14 and is rotatable with respect to this shaft.

The external surface of the sleeve 17 is provided with a radial projection 18 which is adapted to cooperate with a stationary abutment 19 in case of breakage of the electrode wire 2.

The abutment 19 restrains the sleeve 17 against rotation about the shaft 14.

The projection 18 carries an electric contact 20 which is engageable with the abutment 19, acting as the other contact, in cases of wire breakage. Engagement of these two contacts brings about deenergization of the electric motor 7 and disconnection of the power supply source 1. Positioned intermediate of the shaft 14 and the sleeve 17, internally of the latter, is a ball member 21 providing driving connection between the shaft 14 and the sleeve 17.

The herein disclosed automatic stopping device operates, as follows.

When the spark-eroding machine is operating, the electric motor 15 develops a specified driving torque in a direction indicated by the curved arrow line A in FIGS. 1 and 3, while another electric motor 22, also belonging to the wire feed mechanism 11, develops a driving torque directed along the arrow line B in FIG. 1, the driving torque of the electric motor 22 being substantially greater than that of the electric motor 15. Consequently, the electrode wire 2 is unwound from the supply reel 13 and is wound onto the takeup reel 23, and the shaft 14 of the electric motor 15 is made to rotate in the direction opposite to that indicated by the arrow line A. In this way the moving electrode wire 2 is fed through the working zone of the machine. Successive spark discharges initiated by the power supply source 1 between the electrode wire 2 and the workpiece 3 erode the material of the workpiece 3 in the area of the passage of the electrode wire 2. As the workpiece is thus progressively slotted, the electric motor 7 drives the support plate 6 in the cutting direction.

In case of accidental wire breakage, at the moment of breakage, the shaft 14 is rotated by the electric motor 15 in the direction indicated by the arrow line A, and the ball member 21 becomes wedged between the shaft 14 and the internal surface of the sleeve 17. Consequently, the sleeve 17 is made to rotate together with the shaft 14 through an angle limited by the position of the abutment 19, i.e., until the projection 18 carried by the sleeve 17 engages the stationary abutment 19, and thus the electric motor 15 becomes mechanically stopped. Simultaneously, the electric contact 20 carried by the projection 18 engages the abutment 19 which, as it has been already explained, acts as the other contact, and the engagement of these two contacts completes an electric circuit which deenergizes the electric motor 7 and disconnects the power supply source 1 in a known manner. After the breakage of the wire 2 has been eliminated by the operator of the machine, the restored tension of the moving electrode wire 2 brings about automatic disengagement of the contacts 19 and 20, and the machine becomes prepared for normal operation.

What we claim is:

1. In an electrical spark-eroding machine which performs erosion-machining on a workpiece by means of an electrode, of the type comprising: a conductive wire or band for the electrode; a motor means; a receiving reel rotated by the motor means and receiving a supply of the electrode wire or band thereon; and electrical power source supplying power for formation of sparks; means for mounting the workpiece; means for changing the disposition of the workpiece as required; and a device for stopping the machine by interrupting said power source and stopping the functioning of the means for changing the disposition of the workpiece, the improvement being that the device for stopping the machine comprises a supply reel carrying a supply of the wire or band, mounted on a shaft; a further motor means rotating the shaft; an arrangement guiding the electrode wire or band from said supply reel through a working stage, to the receiving reel in such a manner that the torques of said two motor means are in opposition; a mechanism on the shaft including a loose sleeve eccentrically disposed around the shaft and a clutch means on the shaft which couples the sleeve for angular movement with the shaft only in the direction of the torque of said further motor means and not the other; a radial projection on said projection to prevent the completion of rotation of the sleeve when the latter is engaged by the clutch; and means actuated when said projection abuts said stationary abutment, to interrupt said power source and stop the functioning of the means for changing the disposition of the workpiece, whereby in the event of the wire or band snapping, the torque of said further motor means is not opposed and enables the clutch means to couple said sleeve and said shaft for angular movement to cause the machine to stop.

2. The machine as claimed claim 1 in which said means actuated when the projection abuts the stationary abutment includes a first electrical contact arranged on said radial projection, and a second electrical contact arranged on said stationary abutment so as to be able to contact the first electrical contact.

3. The machine as claimed in claim 2 in which said means for changing the disposition of the workpiece includes an electric motor and a gear drive.

4. The machine as claimed in claim 3 in which said clutch means includes a ball.

\* \* \* \* \*